United States Patent
Kihara et al.

(10) Patent No.: US 7,366,071 B2
(45) Date of Patent: Apr. 29, 2008

(54) DATA RECORDING METHOD AND DEVICE, DATA RECORDING MEDIUM, DATA REPRODUCTION METHOD AND DEVICE

(75) Inventors: Takashi Kihara, Chiba (JP); Tatsuya Inokuchi, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 107 days.

(21) Appl. No.: 10/509,887

(22) PCT Filed: Jan. 29, 2004

(86) PCT No.: PCT/JP2004/000868

§ 371 (c)(1),
(2), (4) Date: Oct. 1, 2004

(87) PCT Pub. No.: WO2004/070724

PCT Pub. Date: Aug. 19, 2004

(65) Prior Publication Data

US 2005/0152255 A1    Jul. 14, 2005

(30) Foreign Application Priority Data

Feb. 10, 2003  (JP)  ............................. 2003-031902
Mar. 31, 2003  (JP)  ............................. 2003-093401

(51) Int. Cl.
*G11B 19/04* (2006.01)
*G11B 20/18* (2006.01)
*G11B 15/04* (2006.01)

(52) U.S. Cl. .................. 369/53.21; 369/47.12
(58) Field of Classification Search .................. None
See application file for complete search history.

(56) References Cited

U.S. PATENT DOCUMENTS

| | | | | |
|---|---|---|---|---|
| 4,879,704 A | * | 11/1989 | Takagi et al. ............ | 369/53.21 |
| 5,265,082 A | * | 11/1993 | Gniewek et al. ......... | 369/53.45 |
| 5,828,754 A | * | 10/1998 | Hogan ...................... | 341/69 |
| 5,852,520 A | * | 12/1998 | Ido et al. .................. | 360/40 |
| 6,510,118 B1 | * | 1/2003 | Morikawa .................. | 369/84 |
| 6,621,781 B2 | * | 9/2003 | Yeo ........................... | 369/47.53 |
| 6,661,763 B2 | * | 12/2003 | Kurashina et al. ....... | 369/59.25 |
| 6,876,607 B2 | * | 4/2005 | Furuta et al. ............. | 369/47.25 |
| 2001/0040842 A1 | * | 11/2001 | Yokota et al. ............. | 369/32 |
| 2004/0202082 A1 | * | 10/2004 | Sako et al. ............... | 369/59.24 |

FOREIGN PATENT DOCUMENTS

| | | |
|---|---|---|
| JP | 05-266576 | 10/1993 |
| JP | 09-288864 | 11/1997 |
| JP | 9-288864 | 11/1997 |
| JP | 2002-175662 | 6/2002 |
| JP | 2002-197810 | 7/2002 |
| JP | 2003-303468 | 10/2003 |
| WO | 02/11138 | 2/2002 |

* cited by examiner

*Primary Examiner*—Wayne Young
*Assistant Examiner*—Parul Gupta
(74) *Attorney, Agent, or Firm*—Oblon, Spivak, McClelland, Maier & Neustadt, P.C.

(57) ABSTRACT

The present invention provides a DSV normal controller and a DSV special controller. In only a predetermined region designated on an optical disc, the DSV special control is performed. The DSV special control causes the absolute value of the DSV to increase so that data will be prevented from being normally reproduced. The normal control causes the absolute value of the DSV to converge at 0. When data is reproduced from the optical disc, if the reproduction state of the predetermined region is abnormal, it is determined that the disc is an original disc. An encryption key can be recorded in the predetermined region.

39 Claims, 17 Drawing Sheets

Fig. 4

| | | DATA BITS d1 · · · · · · d8 | CHANNEL BITS d1 · · · · · · · · · · · c14 |
|---|---|---|---|
| 00 | 0 | 0 0 0 0 0 0 0 0 | 0 1 0 0 1 0 0 0 1 0 0 0 0 0 |
| 01 | 1 | 0 0 0 0 0 0 0 1 | 1 0 0 0 0 1 0 0 0 0 0 0 0 0 |
| 02 | 2 | 0 0 0 0 0 0 1 0 | 1 0 0 1 0 0 0 0 1 0 0 0 0 0 |
| 03 | 3 | 0 0 0 0 0 0 1 1 | 1 0 0 0 1 0 0 0 1 0 0 0 0 0 |
| ⋮ | ⋮ | ⋮ | ⋮ |
| 80 | 128 | 1 0 0 0 0 0 0 0 | 0 1 0 0 1 0 0 0 1 0 0 0 0 1 |
| 81 | 129 | 1 0 0 0 0 0 0 1 | 1 0 0 0 0 1 0 0 1 0 0 0 0 1 |
| 82 | 130 | 1 0 0 0 0 0 1 0 | 1 0 0 1 0 0 0 0 1 0 0 0 0 1 |
| 83 | 131 | 1 0 0 0 0 0 1 1 | 1 0 0 0 1 0 0 0 1 0 0 0 0 1 |
| ⋮ | ⋮ | ⋮ | ⋮ |
| 8C | 140 | 1 0 0 0 1 1 0 0 | 0 1 0 0 0 0 0 0 1 0 0 0 0 1 |
| ⋮ | ⋮ | ⋮ | ⋮ |
| 98 | 152 | 1 0 0 1 1 0 0 0 | 0 1 0 0 1 0 0 0 0 0 0 0 0 1 |
| ⋮ | ⋮ | ⋮ | ⋮ |
| B8 | 184 | 1 0 1 1 1 0 0 0 | 0 1 0 0 1 0 0 0 0 0 1 0 0 1 |
| ⋮ | ⋮ | ⋮ | ⋮ |
| BA | 186 | 1 0 1 1 1 0 1 0 | 1 0 0 1 0 0 0 0 0 0 1 0 0 1 |
| ⋮ | ⋮ | ⋮ | ⋮ |
| C9 | 201 | 1 0 1 1 1 0 0 0 | 1 0 0 0 0 1 0 0 0 0 0 0 0 1 |
| ⋮ | ⋮ | ⋮ | ⋮ |
| E2 | 226 | 1 0 1 1 1 0 1 0 | 1 0 0 0 0 1 0 0 0 1 0 0 1 0 |

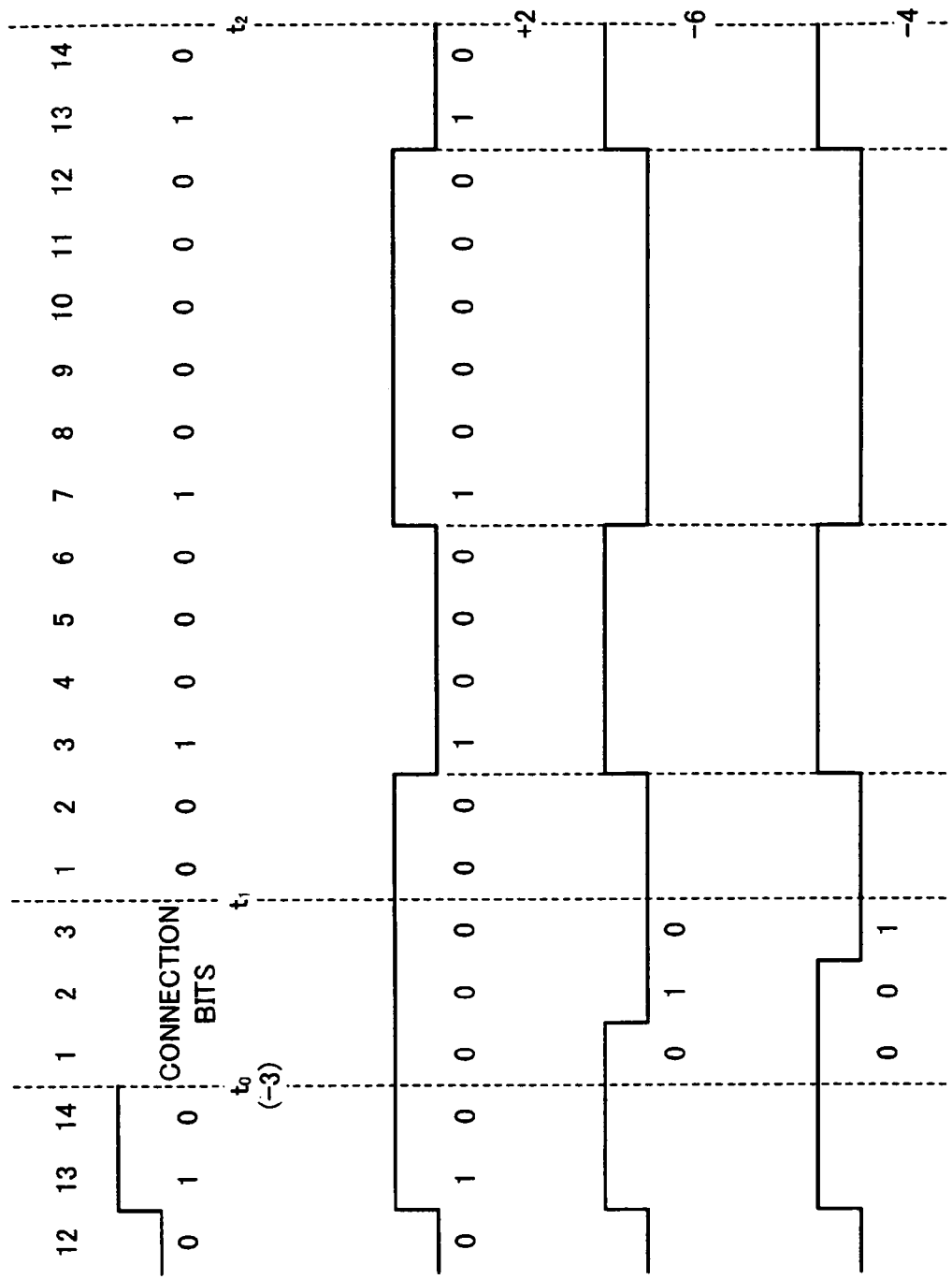

Fig. 9

| SYNC/DATA | EFM SIGNAL | d-DSV | DSV |
|---|---|---|---|
| SYNC | 1111111111110000000000011 | 2 | 2 |
| S0 | 111 1100000000001 | -5 | -3 |
| [24] | 111 10000111110000 | 1 | -2 |
| [5F] | 111 1100000000111 | -1 | -3 |
| [5E] | 110 00011111111000 | 3 | 0 |
| [1F] | 001 11000000011111 | -1 | -1 |
| [3E] | 110 00011111110000 | 1 | 0 |
| [54] | 011 10000111111000 | -1 | -1 |
| [57] | 011 11000111111000 | 1 | 0 |
| [3F] | 011 11000000001111 | -1 | -1 |
| [5E] | 100 00011111111000 | 1 | 0 |
| [44] | 011 10000111000111 | 1 | 1 |
| [3E] | 110 00011111110000 | 1 | 2 |
| [56] | 001 11100011111000 | 1 | 3 |
| [4E] | 000 00011110000111 | -3 | 0 |
| [3C] | 100 01111111110000 | 3 | 3 |
| [4E] | 000 00011110000111 | -3 | 0 |
| [48] | 100 01110001111000 | -1 | -1 |
| [28] | 011 10001110001111 | 3 | 2 |
| [4F] | 111 11000001111000 | 1 | 3 |
| [1E] | 000 00011111100000 | -5 | -2 |
| [18] | 111 10001111100000 | 1 | -1 |

Fig. 10

| SYNC/DATA | EFM SIGNAL | d-DSV | DSV |
|---|---|---|---|
| [53] | 000 00111111000111 | 1 | 0 |
| [4C] | 000 01111110000111 | 1 | 1 |
| [38] | 100 01110000001111 | -1 | 0 |
| [2E] | 000 00011110001111 | -1 | -1 |
| [1F] | 110 00111111100000 | 1 | 0 |
| [5E] | 001 11100000000111 | -3 | -3 |
| [5D] | 111 11110000000111 | 3 | 0 |
| [5C] | 000 01111111111000 | 3 | 3 |
| [4F] | 001 11000001111000 | -3 | 0 |
| [48] | 011 10001110000111 | 1 | 1 |
| [34] | 111 10000011110000 | -1 | 0 |
| [3F] | 011 11000000001111 | -1 | -1 |
|  | 111 | 3 | 2 |
| SYNC | 00000000000111111111100 | -2 | 0 |
| S1 | 001 11111111100011 | 7 | 7 |
| [34] | 111 10000011110000 | -1 | 6 |
| [3F] | 000 00111111110000 | -1 | 5 |
| [5D] | 000 00001111111000 | -3 | 2 |
| [1F] | 001 11000000011111 | -1 | 1 |
| [5F] | 111 11000000000111 | -1 | 0 |
| [40] | 100 01110000111000 | -3 | -3 |
| [28] | 011 10001110001111 | 3 | 0 |
| [57] | 110 00111100000111 | 1 | 1 |
| [34] | 111 10000011110000 | -1 | 0 |

Fig. 11

| SYNC/DATA | EFM SIGNAL | d-DSV | DSV | R |
|---|---|---|---|---|
| SYNC | 1111111111100000000000011 | 2 | 2 | |
| S1 | 111 11000000000001 | -5 | -3 | -3 |
| [24] | 111 10000111110000 | 1 | -2 | -62 |
| +60 IS DESIGNATED. | | | | |
| [5F] | 111 11000000000111 | -1 | -3 | -63 |
| [5E] | 110 00011111111000 | 3 | 0 | -60 |
| [1F] | 111 11000000011111 | 3 | 3 | -57 |
| [3E] | 111 11100000001111 | 3 | 6 | -54 |
| [54] | 100 01111100000111 | 1 | 7 | -53 |
| [57] | 111 11000111111000 | 3 | 10 | -50 |
| [3F] | 111 11000000001111 | 1 | 11 | -49 |
| [5E] | 110 00011111111000 | 3 | 14 | -46 |
| [44] | 111 10000111000111 | 3 | 17 | -43 |
| [3E] | 111 11100000001111 | 3 | 20 | -40 |
| [56] | 110 00011100000111 | -1 | 19 | -41 |
| [4E] | 111 11100001111000 | 3 | 22 | -38 |
| [3C] | 111 10000000001111 | -1 | 21 | -39 |
| [4E] | 111 11100001111000 | 3 | 24 | -36 |
| [48] | 111 10001110000111 | 3 | 27 | -33 |
| [28] | 111 10001110001111 | 5 | 32 | -28 |
| [4F] | 110 00111110000111 | 3 | 35 | -25 |
| [1E] | 111 11100000011111 | 5 | 40 | -20 |
| [18] | 111 10001111100000 | 1 | 41 | -19 |

Fig. 12

| SYNC/DATA | EFM SIGNAL | d-DSV | DSV | R |
|---|---|---|---|---|
| [53] | 000 00111111000111 | 1 | 42 | -18 |
| [4C] | 100 01111110000111 | 3 | 45 | -15 |
| [38] | 111 10001111110000 | 3 | 48 | -12 |
| [2E] | 000 00011110001111 | -1 | 47 | -13 |
| [1F] | 111 11000000011111 | 3 | 50 | -10 |
| [5E] | 111 11100000000111 | 1 | 51 | -9 |
| [5D] | 111 11110000000111 | 3 | 54 | -6 |
| [5C] | 100 01111111111000 | 5 | 59 | -1 |
| [4F] | 111 11000001111000 | 1 | 60 | 0 |
| [48] | 011 10001110000111 | 1 | 61 | 1 |
| [34] | 111 10000011110000 | -1 | 60 | 0 |
| [3F] | 011 11000000001111 | -1 | 59 | -1 |
|  | 111 | 3 | 62 |  |
| SYNC | 00000000000111111111100 | -2 | -2 |  |
| S1 | 001 11111111100011 | 7 | 5 | 5 |
| [34] | 100 01111100001111 | 3 | 8 | -52 |
| +60 IS DESIGNATED. |  |  |  |  |
| [3F] | 111 11000000001111 | 1 | 9 | -51 |
| [5D] | 111 11110000000111 | 3 | 12 | -48 |
| [1F] | 110 00111111100000 | 1 | 13 | -47 |
| [5F] | 000 00111111111000 | 1 | 14 | -46 |
| [40] | 111 10001111000111 | 5 | 19 | -41 |
| [28] | 111 10001111000111 | 5 | 24 | -36 |
| [57] | 111 11000011111000 | 3 | 27 | -33 |
| [34] | 000 01111100001111 | 1 | 28 | -32 |

Fig. 13

| DATA SYMBOL | STATE 1 CODE WORD MSB | STATE 1 CODE WORD LSB | NEXT STATE | STATE 2 CODE WORD MSB | STATE 2 CODE WORD LSB | NEXT STATE | STATE 3 CODE WORD MSB | STATE 3 CODE WORD LSB | NEXT STATE | STATE 4 CODE WORD MSB | STATE 4 CODE WORD LSB | NEXT STATE |
|---|---|---|---|---|---|---|---|---|---|---|---|---|
| 0 | 00100000000000 | 00000001001 | 1 | 01000001001 | 00000100000 | 2 | 00100000000 | 00001001 | 1 | 00100000000 | 00001001 | 2 |
| 1 | 00100000000000 | 00000001010 | 1 | 00100000100 | 00000010 | 1 | 10000001001 | 00100000 | 3 | 00100000000 | 00001010 | 3 |
| ... | ... | ... | ... | ... | ... | ... | ... | ... | ... | ... | ... | ... |
| 254 | 00000010010 | 00010000100 | 2 | 01000100000 | 00000010001 | 1 | 10010000000 | 00010000 | 1 | 01000100000 | 00001001 | 1 |
| 255 | 00000010010 | 00010000100 | 2 | 01000100000 | 00000010010 | 1 | 10010000000 | 00010000 | 1 | 01000100000 | 00001010 | 1 |

Fig. 14

| DATA SYMBOL | STATE 1 | | NEXT STATE | STATE 2 | | NEXT STATE | STATE 3 | | NEXT STATE | STATE 4 | | NEXT STATE |
|---|---|---|---|---|---|---|---|---|---|---|---|---|
| | CODE WORD | | | CODE WORD | | | CODE WORD | | | CODE WORD | | |
| | MSB ........ LSB | | | MSB ........ LSB | | | MSB ........ LSB | | | MSB ........ LSB | | |
| 0 | 0000010010000000 | | 4 | 0000010010000000 | | 4 | 0100100001001000 | | 2 | 0100100001001000 | | 2 |
| 1 | 0000100100000000 | | 4 | 0000100100000000 | | 4 | 0100100001001000 | | 3 | 0100100001001000 | | 3 |
| ......... | ......... | | ......... | ......... | | ......... | ......... | | ......... | ......... | | ......... |

DATA RECORDING METHOD AND DEVICE, DATA RECORDING MEDIUM, DATA REPRODUCTION METHOD AND DEVICE

TECHNICAL FIELD

The present invention relates to data recording method and apparatus, a data recording medium, and data reproducing method and apparatus.

BACKGROUND ART

Since optical discs such as a CD (Compact Disc) and a CD-ROM (Compact Disc Read Only Memory) are easy to handle and produced at relatively low cost, they have been widely used as recording mediums that store data. In recent years, a CD-R (Compact Disc Recordable) disc and a CD-RW (Compact Disc ReWritable) disc have come out. Data can be easily recorded to these discs. Thus, optical discs in accordance with the CD standard such as a CD-DA disc, a CD-ROM disc, a CD-R disc, and a CD-RW disc are becoming the main stream of data recording mediums. In addition, in recent years, using MP3 (MPEG1 Audio Layer-3) and ATRAC (Adaptive Transform Acoustic Coding) 3, audio data is compressed and recorded on a CD-ROM disc, a CD-R disc, a CD-RW disc, or the like.

However, as a CD-R disc and a CD-RW disc have come out, data recorded on a CD can be easily copied. Thus, a problem about copyright protection has arisen. It is necessary to take countermeasures to protect content data of a CD from being recorded.

FIG. 17 schematically shows a flow of a copy operation. A reproducing apparatus denoted by reference numeral 71 reproduces data from an original disc for example a CD 72. Reference numeral 73 represents an optical pickup. Reference numeral 74 represents a reproduction signal processing portion. Reproduction data is supplied from the reproducing apparatus 71 to a recording processing portion 82 of a recording apparatus 81. An optical pickup 83 records the reproduction data to an optical disc for example a CD-R 84. Recorded contents of the original CD 72 are copied to the CD-R 84. Using the reproducing apparatus 71 and the recording apparatus 81, a copied disc of the original CD 72 can be easily produced.

For a CD, to decrease a DC component of a digital signal that is recorded, EFM (Eight to Fourteenth Modulation) is performed. In the EFM, each data symbol (eight data bits) is converted into a code symbol of 14 channel bits. Three connection bits are added between two sequences of 14 channels bits.

As related art, a method for prohibiting digital information from being copied in accordance with a characteristic of a digital modulating system such as the EFM is described in Japanese Patent Laid-Open Publication No. HEI 9-288864. In the related art, a special encoder and a standard encoder are used. In a standard encoder, DSV (Digital Sum Variation) is cumulated in one direction. In a special encoder, the DSV is prevented from being cumulated in one direction. When a predetermined data sequence is re-encoded by a standard encoder, since the DSV diverges, data cannot be normally reproduced. Using that characteristic, contents can be prevented from being copied.

To determine whether the disc is an original disc or a copied disc, when an original disc is produced, a defect is recorded. When the defect is detected in data reproduced from a disc, it can be determined that the disc is an original disc. In such a method, there is a problem of which original disc contains such a defect. In addition, depending on the type of a defect, it may be able to be copied. As a result, the contents of the original disc cannot be prevented from being copied to a CD-R disc. In addition, unlike a standard encoder that causes the DSV to diverge, a special encoder that prevents the DSV from diverging has a limited number of types of data that can be used. As a result, a complicated data control that also includes an error correction encoding process is required.

Therefore, an object of the present invention is to provide data recording method and apparatus, a data recording medium, and data reproducing method and apparatus.

DISCLOSURE OF THE INVENTION

Claim 1 of the present invention is a data recording method, comprising the steps of modulating input data for each predetermined unit; selecting predetermined connection bits that are placed between two sequences of modulated data, each sequence corresponding to the predetermined unit, so that the absolute value of a DSV increases in only a predetermined region; and recording the modulated data for each predetermined unit and the selected connection bits.

Claim 13 of the present invention is a data recording apparatus, comprising modulating means for modulating input data for each predetermined unit and selecting predetermined connection bits placed between two sequences of modulated data, each sequence corresponding to the predetermined unit; recording means for recording the modulated data for each predetermined unit and the predetermined connection bits; and controlling means for causing the modulating means to select connection bits so that the absolute value of the DSV to increase in a predetermined region.

Claim 18 of the present invention is a recording medium on which a plurality of predetermined units of modulated data and connection bits are recorded, the connection bits being placed between two sequences of modulated data, each sequence corresponding to the predetermined unit, the connection bits being recorded in a predetermined region so that the absolute value of a DSV increases.

Claim 22 of the present invention is a data reproducing method, comprising the steps of reproducing data from a recording medium on which a plurality of predetermined units of modulated data and connection bits are recorded, the connection bits being placed between two sequences of modulated data, each sequence corresponding to the predetermined unit, the connection bits being recorded in a predetermined region so that the absolute value of a DSV increases; and detecting a reproduction state from the reproduced data. Claim 30 of the present invention is a data reproducing apparatus, comprising reproducing means for reproducing data from a recording medium on which a plurality of predetermined units of modulated data and connection bits are recorded, the connection bits being placed between two sequences of modulated data, each sequence corresponding to the predetermined unit, the connection bits being recorded in a predetermined region so that the absolute value of a DSV increases; and controlling means for causing the reproducing means to reproduce the predetermined region and detect a reproduction state of the reproduced data.

Claim 23 of the present invention is a data reproducing method, further comprising the step of determining whether or not the recording medium is an original recording medium in accordance with the reproduction state. Claim 31 of the present invention is a data reproducing apparatus, wherein it is determined whether or not the recording medium is an original recording medium in accordance with the reproduction state.

According to the present invention, the DSV of data that is recorded is controlled so that the absolute value of the DSV increases in the predetermined region. When data is reproduced from the predetermined region, a read error or a data error takes place. Thus, it can be determined that the data recording medium from which data is reproduced is an original. In addition, a read error or a data error that takes place in the predetermined region can be correlated with encryption key information.

BRIEF DESCRIPTION OF DRAWINGS

FIG. 4 is a schematic diagram showing a part of an EFM conversion table.

FIG. 5 is a schematic diagram describing an example of a method for selecting connection bits and an example of a method for controlling the DSV.

FIG. 9 is a schematic diagram showing an example of a DSV control of the conventional EFM modulation.

FIG. 10 is a schematic diagram showing an example of the DSV control of the conventional EFM modulation.

FIG. 11 is a schematic diagram describing a more practical example of the DSV control according to the present invention.

FIG. 12 is a schematic diagram describing a more practical example of the DSV control according to the present invention.

FIG. 13 is a schematic diagram describing a main table of a convention table used in an 8-16 modulation.

FIG. 14 is a schematic diagram describing an auxiliary table of the conversion table used in the 8-16 modulation.

BEST MODES FOR CARRYING OUT THE INVENTION

Figure 1:
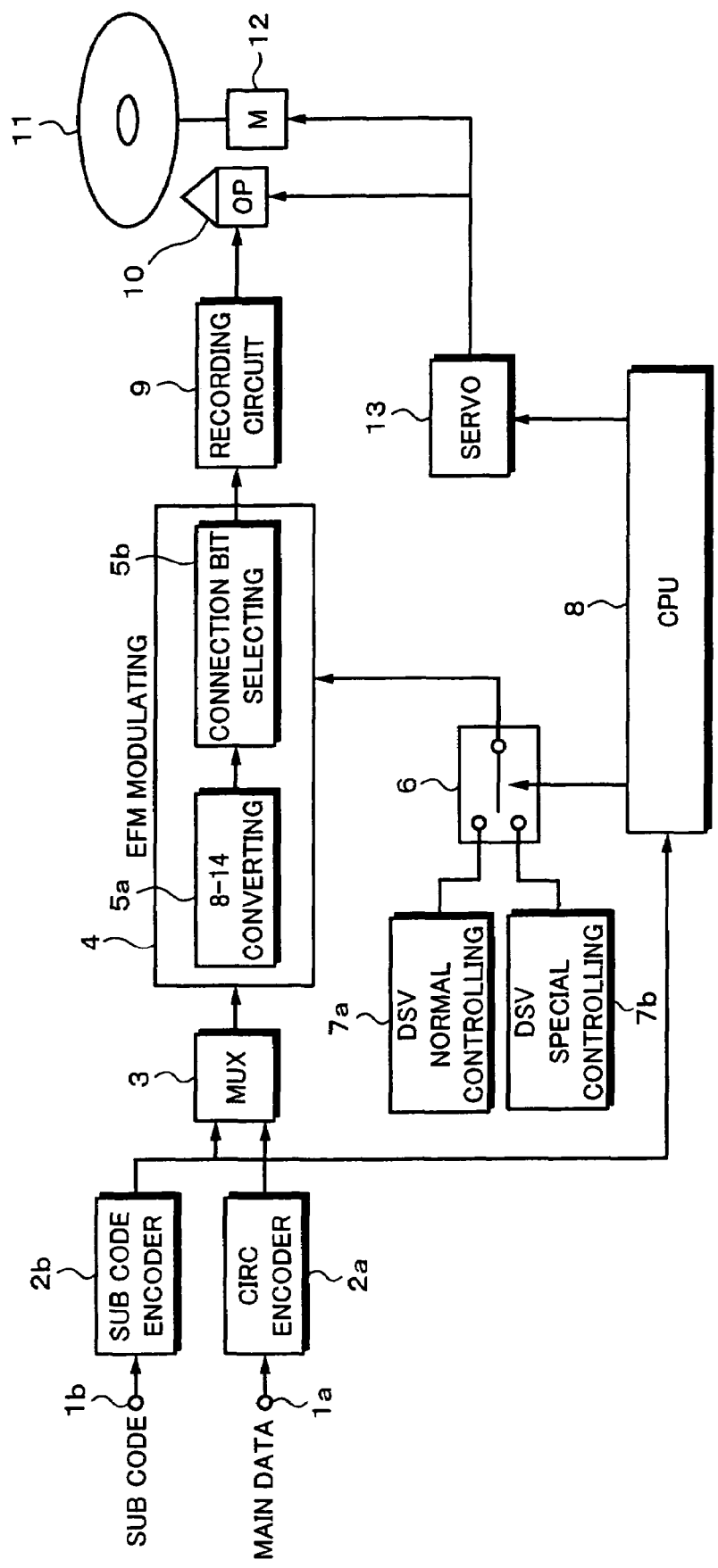
FIG. 1 is a block diagram showing the structure of a recording apparatus according to an embodiment of the present invention.

Next, with reference to FIG. 1, a recording apparatus according to an embodiment of the present invention will be described. Main data such as PCM audio data that is recorded is supplied from an input terminal 1a to a CIRC (Cross Interleave Reed-Solomon Code) encoder 2a. The CIRC encoder 2a performs an error correction code encoding process and a scrambling process for the main data so as to add error correction parity data or the like to the main data. In other words, in the error correction encoding process and the scrambling process, one sample or one word of 16 bits is divided into two samples of high order 16 bits and low order 16 bits. In the error correction code encoding process and the scrambling process, error correction parity data or the like is added in each symbol in accordance with for example the CIRC. A sub code is input from an input terminal 1b to a sub code encoder 2b. The sub code encoder 2b converts the sub code into a sub code that has an EFM frame format.

An output of the CIRC encoder 2a and an output of the sub code encoder 2b are supplied to a multiplexer 3. The multiplexer 3 arranges the outputs of the CIRC encoder 2a and the sub code encoder 2b in a predetermined order. Output data of the multiplexer 3 is supplied to an EFM (Eight to Fourteen Modulation) modulating portion 4. The EFM modulating portion 4 has an 8-14 converting portion 5a and a connection bit selecting portion 5b. The 8-14 converting portion 5a converts a data symbol of eight bits into a code word of 14 channel bits in accordance with a conversion table. The connection bit selecting portion 5b selects connection bits (also referred to as margining bits). The connection bit selecting portion 5b selects connection bits so that a condition for a run length of the EFM is satisfied.

The EFM modulating portion 4 has a DSV normal controlling portion 7a and a DSV special controlling portion 7b. A switch 6 selects the controlling portion 7a or the controlling portion 7b. The switch 6 is controlled by a system controller 8 composed of a CPU. A DSV special control is performed in only a predetermined region that is pre-designated on an optical disc. The DSV special control causes the absolute value of the DSV to increase in a direction of which data is prevented from being normally reproduced. On the other hand, the DSV regular control causes the absolute value of the DSV to converge at 0. In that example, the DSV represents a cumulated DSV.

The predetermined region is defined by address information of a sub code generated by the sub code encoder 2b. The predetermined region is for example an area for copy protection or security. In reality, a content recorded on a disc is encrypted. Information necessary for generating encryption key information is recorded in the predetermined region. Alternatively, identification information unique to a disc may be recorded in the predetermined region. In addition, when the DSV is specially controlled in the predetermined region, this state may represent that the disc is an original disc. Since the DSV special control is performed for not only main data, but sub code, the sub code cannot be reproduced from the predetermined region. However, when sub codes (addresses) preceded and followed by the predetermined region are interpolated, the predetermined region can be obtained as an address.

The EFM modulating portion 4 generates a record signal in the EFM frame format for a CD. The record signal is supplied from the EFM modulating portion 4 to an optical pickup 10 through a recording circuit 9. The optical pickup 10 records data to a recordable optical disc 11 such as a CD-R (Recordable) disc. The optical disc 11 is placed on a turn table and rotated by a spindle motor 12. The spindle motor 12 is driven to rotate at constant linear velocity (CLV) under the control of a servo portion 13.

The servo portion 13 generates various types of servo drive signals that are a focus servo drive signal, a tracking servo drive signal, a thread servo drive signal, and a spindle servo drive signal in accordance with an operation command received from the system controller 8 composed of a CPU. The servo portion 13 outputs these signals to the spindle motor 12 and the optical pickup 10. The system controller 8 controls the entire recording apparatus. The output of the sub code encoder 2b is supplied to the system controller 8. A display device, an operating switch, and so forth are connected to the system controller 8. The optical pickup 10 focuses a light beam of a semiconductor laser on a signal recording side of the optical disc 11 and records data on concentrically circular shaped tracks or spirally shaped tracks formed on the optical disc 11. The entire optical pickup 10 is moved by a thread mechanism.

In a CD, with a total of 12 samples of digital audio data of two channels (namely, 24 symbols), a parity Q and a parity P of four symbols each are formed. A total of 33 symbols (264 data bits) of which a sub code of one symbol is added to 32 symbols is treated as one block. In other words, one frame of which data has been EFM modulated contains a sub code of one symbol, data of 24 symbols, a Q parity of four symbols, and a P parity of four symbols.

In the EFM modulating system, each symbol (of eight data bits) is converted into 14 channel bits. The minimum time period Tmin (that is a time period of which the number of 0's between two 1's of a record signal is minimum) in the EFM modulation is 3T that is equivalent to a pit length of 0.87 μm. The pit length equivalent to T is the minimum pit length. Three connection bits are placed between two sequences having 14 channel bits each. In addition, a frame sync pattern is added at the beginning of a frame. A frame sync pattern is composed of a sequence of 11T, a sequence of 11T, and a sequence of 2T, where T is a period of one channel bit. Such a pattern does not take place in the EFM modulation rule. Thus, with such a special pattern, a frame sync can be detected. One EFM frame is composed of a total of 588 channel bits. The frame frequency is 7.35 kHz.

A block of 98 EFM frames is referred to as sub code frame (or sub code block). A sub code frame of which 98 EFM frames are successively arranged in the vertical direction is composed of a frame synchronous portion, a sub code portion, data, and a parity portion. The frame synchronous portion detects the beginning of the sub code frame. One sub code frame is equivalent to 1/75 seconds of reproduction duration of a regular CD.

The sub code portion is composed of 98 EFM frames. The first two frames of the sub code portion are a synchronous pattern of the sub code frame and an out-of-rule pattern of the EFM. The respective bits of the sub code portion compose P, Q, R, S, T, U, V, and W channels.

The R channel to W channel are used for special purposes such as a still picture and a subtitle of so-called Karaoke. On the other hand, the P channel and Q channel are used for a track position controlling operation for a pickup that reproduces digital data recorded on a disc.

The P channel is used to record a signal whose level is "0" in a so-called lead-in area placed in an inner peripheral portion of a disc and whose level alternately varies between "0" and "1" in a so-called lead-out area placed in an outer peripheral portion thereof. In addition, the P channel is used to record a signal whose level is "1" in a music program of a program region placed between the lead-in area and the lead-out area of the disc and whose level is "0" not in a music program thereof. The P channel is used to search each music program when digital audio data is reproduced from a CD.

The Q channel is used to precisely control digital audio data that is reproduced from the CD. One sub code frame of the Q channel is composed of a synchronous bit portion, a control bit portion, an address bit portion, a data bit portion, and a CRC bit portion.

Figure 2:
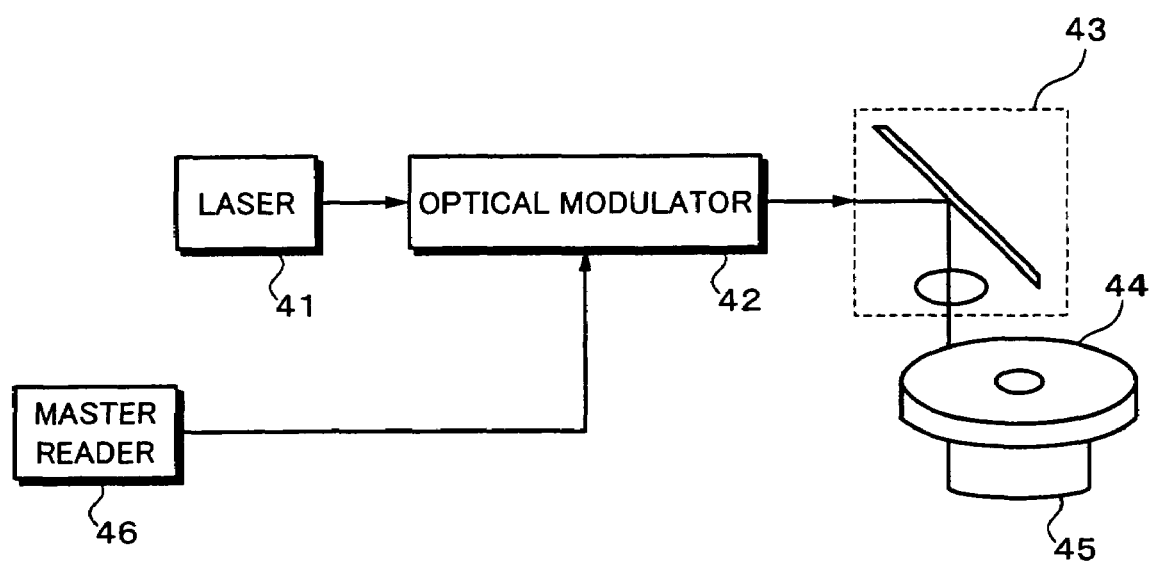
FIG. 2 is a block diagram showing an example of the structure of a mastering apparatus according to the present invention.

FIG. 2 shows the structure of a mastering apparatus that produces a reproduction-only optical disc. The mastering apparatus comprises a laser 41, an optical modulator 42, and an optical pickup 43. The laser 41 is a gas laser such as an Ar ion laser, a He—Cd laser, or a Kr ion laser or a semiconductor laser. The optical modulator 42 is an acousto-optic effect type modulator or an electro-optical type modulator that modulates laser light emitted from the laser 41. The optical pickup 43 is recording means having an objective lens or the like that collects laser light that passes through the optical modulator 42 and irradiates a photoresist side of a disc-shaped glass original 44 on which photoresist as a photosensitive substance has been coated.

The optical modulator 42 modulates laser light emitted from the laser 41 in accordance with a record signal. The mastering apparatus emits the modulated laser light on the glass original 44. As a result, a master on which data has been recorded is produced. In addition, the mastering apparatus has a servo circuit (not shown) that causes the distance between the optical pickup 43 and the glass original 44 to be constant, the tracking of the optical pickup 43, and the rotation driving operation of a spindle motor 45. The rotations of the glass original 44 are driven by the spindle motor 45.

The record signal is supplied from a master reader 46 to the optical modulator 42. The master reader 46 reproduces from the optical disc the record data that has been recorded thereto by the recording apparatus shown in FIG. 1. The photoresist on the glass original 44 is exposed with a laser beam modulated by the optical modulator 42. The glass original 44 is developed. Thereafter, the glass original 44 is developed and then an electro-plating process is performed therefor. As a result, a metal master is produced. Thereafter, with the metal master, a stamper is produced. With the stamper, an optical disc is produced in the compression molding method, injection molding method, or the like.

Figure 3:
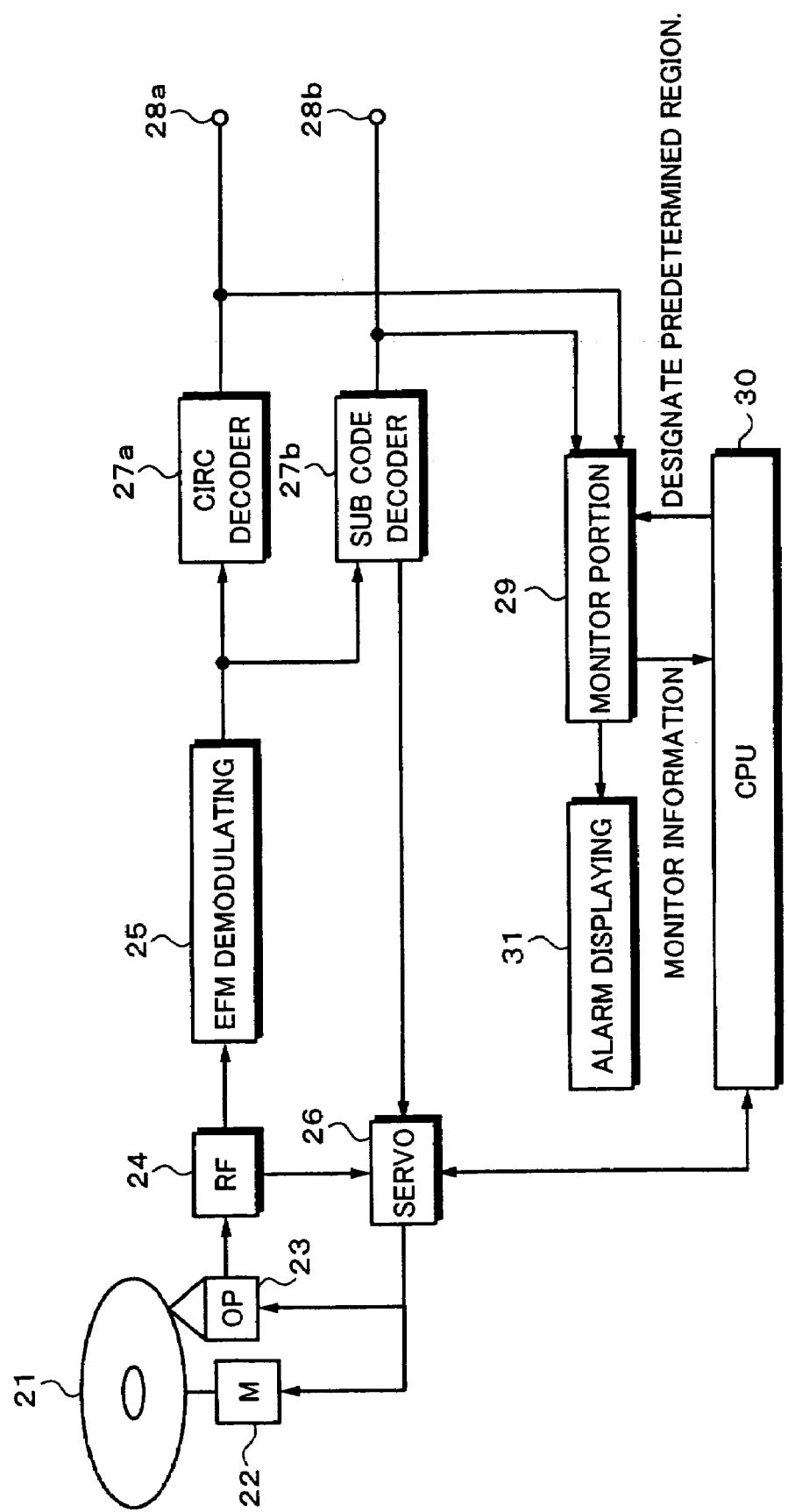
FIG. 3 is a block diagram showing the structure of a reproducing apparatus according to the embodiment of the present invention.

FIG. 3 shows an example of the structure of a reproducing apparatus that reproduces data from an optical disc produced in the foregoing mastering process and stamping process. In FIG. 3, reference numeral 21 represents a disc produced in the mastering process and the stamping process. Reference numeral 22 represents a spindle motor that drives the rotations of the disc 21. Reference numeral 23 represents an optical pickup that reproduces a signal from the disc 21. The optical pickup 23 comprises a semiconductor laser, an optical system, a detector, and focus and tracking mechanisms. The semiconductor laser emits laser light on the disc 21. The optical system is for example an objective lens. The detector receives light reflected from the disc 21. The optical pickup 23 is moved in the radius direction of the disc 21 by a thread mechanism (not shown).

An output signal of for example a four-divided detector of the optical pickup 23 is supplied to an RF portion 24. The RF portion 24 calculates output signals of the individual detector members of the four-divided detector. As a result, the RF portion 24 generates a reproduction (RF) signal, a focus error signal, and a tracking error signal. The reproduction signal is supplied to an EFM demodulating portion 25 through a sync detecting portion (not shown). The EFM demodulating portion 25 performs an EFM demodulating process for the reproduction signal. The detected frame sync, focus error signal, and tracking error signal are supplied to a servo portion 26. The servo portion 26 controls the rotating operation of the spindle motor 22 in accordance with a reproduction clock of the RF signal. In addition, the servo portion 26 controls a focus servo and a tracking servo of the optical pickup 23.

Main digital data is supplied from the EFM demodulating portion 25 to a CIRC decoder 27a. The CIRC decoder 27a performs an error correcting process for the main digital data. Thereafter, the main digital data is interpolated by an interpolating circuit (not shown). The interpolated data is obtained as reproduction data from an output terminal 28a. Sub code data is supplied from the EFM demodulating portion 25 to a sub code decoder 27b. The sub code decoder 27b decodes sub codes of P and Q channels. The decoded sub codes are output and displayed.

Address information of which the sub code of Q channel has been decoded is supplied to the servo portion 26. A control signal is supplied from a system controller 30 composed of a CPU to the servo portion 26. The system controller 30 is composed of the CPU that is a microcomputer. The system controller 30 controls the entire operations of the reproducing apparatus. In association with the system controller 30, the reproducing apparatus has operation buttons and a display portion (not shown). The system controller 30 controls the servo portion 26 so as to access a desired position of the disc 21. As a result, the system controller 30 can perform a seek operation that reproduces information from a desired address of the disc 21.

The main data is supplied from the CIRC decoder 27a to a monitor portion 29. The sub code data is supplied from the sub code decoder 27b to a monitor portion 29. A command signal that represents a predetermined region is supplied from the system controller 29 to the monitor portion 29. The predetermined region is a region in which the DSV is specially controlled when data is recorded. When the predetermined region is designated, the monitor portion 29 observes address information of the sub code of Q channel and monitors the reproduction state of the predetermined region. In the predetermined region, since the DSV is specially controlled, not only the main data, but the sub code cannot be normally reproduced. However, in other than the predetermined region, the sub code can be normally reproduced. The predetermined region can be detected in accordance with the reproduced sub code. When necessary, in the predetermined region, address information can be obtained by interpolation.

In the predetermined region, the absolute value of the DSV is increased so that data is prevented from being normally reproduced. In reality, the increased absolute value of the DSV adversely affects an asymmetry compensation or the like of the reproducing circuit. As a result, a read error takes place. Alternatively, since data is erroneously corrected, many errors will take place. Thus, a situation of which a data value of the predetermined region varies whenever it is read takes place. The monitor portion 29 detects monitor information of the reproduction state or error state and supplies the monitor information to the system controller 30.

When the DSV has not been specially controlled, in other words, the disc is a copied disc on which data reproduced from an original disc has been recorded, since the DSV is normally controlled for binary data (abnormal binary data) generated in the predetermined region, the absolute value of the DSV does not increase. In other words, when the disc is a copied disc, data can be normally reproduced from the predetermined region. Depending on whether or not data can be normally reproduced from the predetermined region, it can be determined whether the disc is an original disc or a copied disc. Thus, in accordance with monitor information that the monitor portion 29 supplies to the system controller 30, the system controller 30 can determine whether the disc from which data is reproduced is an original disc or a copied disc. In addition, the monitor portion 29 may determine whether the disc is an original disc or a copied disc. The monitor portion 29 may control an alarm display portion 31 so as to generate an alarm that represents that the disc is a copied disc. When the determined result represents that the disc is a copied disc, the system controller 30 may prohibit data from being reproduced from the disc.

Alternatively, a value of data for copy protection or security data such as key information may be recorded in the predetermined region in which the DSV is specially controlled. For example, the predetermined region may be divided into a predetermined sub-regions. In this case, the DSV special control and the DSV normal control are alternately performed for the sub-regions. Each sub-region for which the DSV special control is performed, namely data cannot be normally reproduced, is assigned "0" as a logical value. In contrast, each sub-region for which the DSV normal control is performed, namely data can be normally reproduced, is assigned "1" as a logical value. If the predetermined region is composed of eight sub-regions, data of eight bit can be embedded therein. When the disc is a copied disc, since the DSV is normally controlled for the reproduced data, data for copy protection or security cannot be embedded in the predetermined region. Thus, the content cannot be decoded from the disc. As a result, since the content is substantially prohibited from being reproduced, the copy protection for the content can be performed.

Next, the DSV control in the EFM modulation will be described. FIG. 4 shows a part of a conversion table that represents a conversion rule for which eight data bits (referred to as data symbol) are converted into 14 channel bits (referred to as code symbol). In FIG. 4, data bits are represented in hexadecimal notation (00 to FF), decimal notation (0 to 255), and binary notation. "1" in a code symbol of 14 bits represents a position at which a value is inverted. Since a data symbol is composed of eight bits, there are 256 patterns of code symbols. All code symbols of 14 bits satisfy an EFM rule of which the minimum time period (time period for which the number of 0's between two 1's is minimum) Tmin is 3T and the maximum time period (time period for which the number of 0's between two 1's is maximum) Tmax is 11T.

When two sequences of code symbols of 14 bits each are connected, connection bits are required to satisfy the foregoing run length limit conditions of Tmin=3T and Tmax=11T. There are four types of patterns of connection bits (000), (001), (010), and (100). Next, with reference to FIG. 5, an example of connection bits with which two 14-bit sequences are connected will be described.

As shown in FIG. 5A, it is assumed that one 14-bit pattern ends with (010) and the next data symbol is (01110111) (77 in hexadecimal notation; 119 in decimal notation). The data symbol is converted into a 14-bit pattern (00100010000010). At timing $t_0$, the former 14-bit pattern ends. At timing $t_1$, connection bits end and the next 14-bit pattern starts. At timing $t_2$, the next 14-bit pattern ends.

When (100) are used as one of the foregoing four types of connection bits, the condition of Tmin=3T is not satisfied. Thus, this type of connection bits is not used. The other three types of connection bits can be used. Among those types of connection bits, one type of connection bits that cause the DSV to decrease is selected. The DSV is obtained in such a manner that when the level of a waveform is a high +1 is given and that when the level of a waveform is a low, −1 is given. It is assumed that the DSV at timing to is (−3).

FIG. 5B shows a waveform in the case that (000) are used as connection bits. Since the DSV in the period $(t_0-t_1)$ is +3 and the DSV in the period $(t_1-t_2)$ is +2, the DSV at timing $t_2$ is (−3+3+2=+2). FIG. 5C shows a waveform in the case that (010) are used as connection bits. Likewise, since the DSV in the period $(t_0-t_1)$ is −1 and the DSV in the period $(t_1-t_2)$ is −2, the DSV at timing $t_2$ is (−3−1−2=−6). FIG. 5D shows a waveform in the case that (001) are used as connection bits. Likewise, since the DSV in the period $(t_0-t_1)$ is +1 and the DSV in the period $(t_1-t_2)$ is −2, the DSV at timing $t_2$ is (−3+1−2=−4). Thus, the connection bits (000) that cause the DSV at timing $t_2$ to be closest to 0 are selected.

The connection bit selecting portion 5b is disposed in the EFM modulating portion 4 (see FIG. 1). As described above, when the DSV is normally controlled, the connection bit selecting portion 5b selects connection bits that satisfy the EFM modulation run length limit conditions of Tmin=3 and Tmax=11. Among the selected types of connection bits, one type of connection bits that cause the DSV to converge is selected. According to the embodiment of the present invention, the DSV special control can be selectively performed. When the DSV is specially controlled, the EFM modulation is preformed so that the absolute value of the DSV increases and a data read error takes place.

In the example shown in FIG. 5, when (01110111) are always used as a data symbol and (010) are always used as connection bits, the DSV increases in the minus direction. As a result, the absolute value of the DSV increases so that data cannot be normally reproduced.

Figures 6A, 6B:
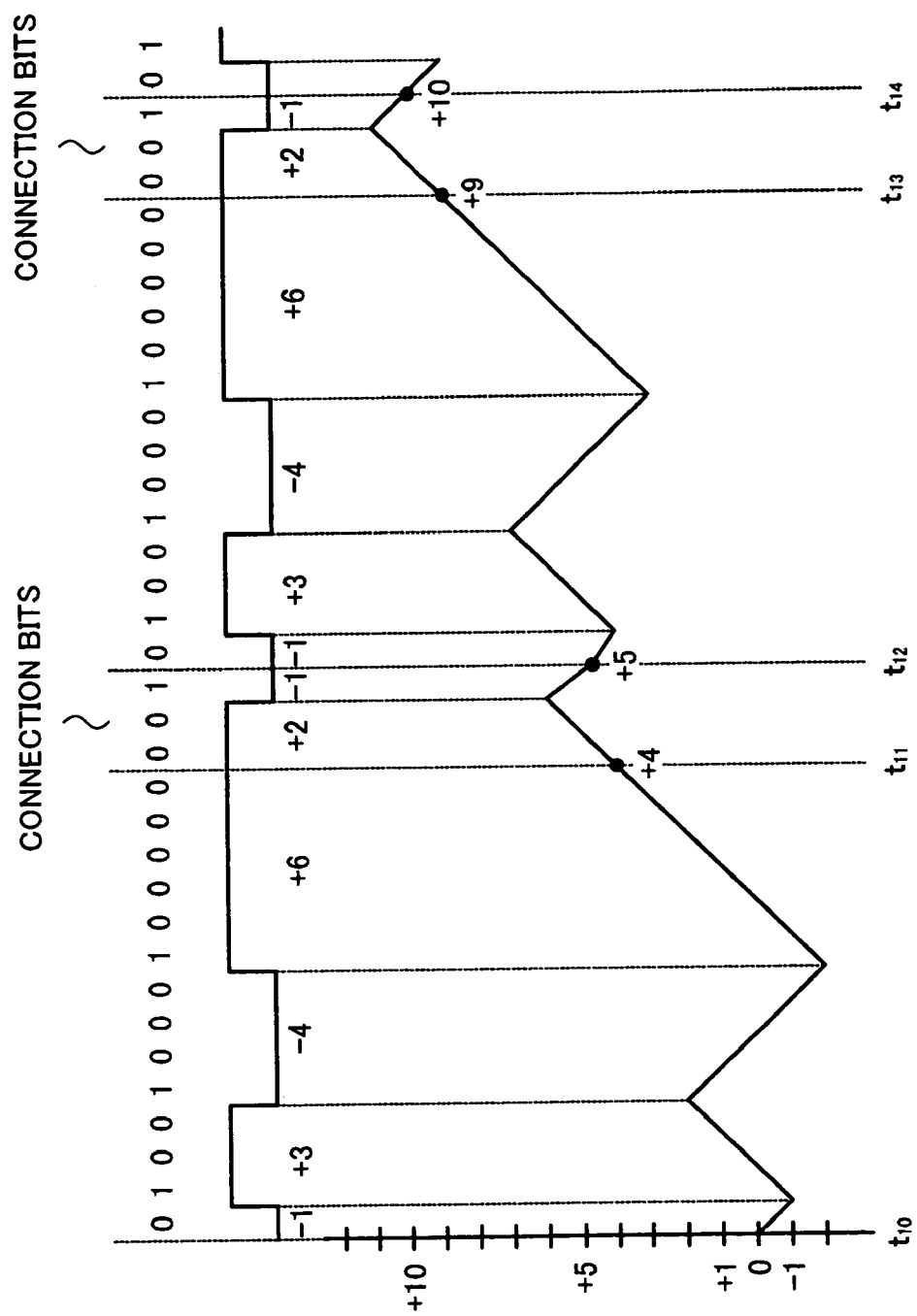
FIG. 6 is a schematic diagram describing another example of the method for controlling the DSV.

FIG. 6 shows another example of the DSV special control. As shown in FIG. 6A, it is assumed that there is a data symbol (00000000) ("00" in hexadecimal notation; "0" in decimal notation). The data symbol is converted into a pattern of 14 bits (01001000100000). It is assumed that at timing $t_{10}$, a pattern of connection bits ends and a pattern of 14 bits starts and that at timing $t_{11}$, the pattern of 14 bits ends. Assuming that the DSV at timing $t_{10}$ is 0, the cumulated DSV at timing $t_{11}$ is +4.

In that example, when (001) are used as connection bits, in the period of the connection bits, the DSV is +1. At timing $t_{12}$ of which the next pattern of 14 bits starts, the DSV is +5. At timing of which the next pattern of 14 bits ends, the DSV is +9. At timing $t_{14}$ of which the connection bits (001) end, the DSV is +10. Thus, the absolute value of the DSV increases. When (010) are used as connection bits, the DSV can be controlled in the same manner.

Figure 7:
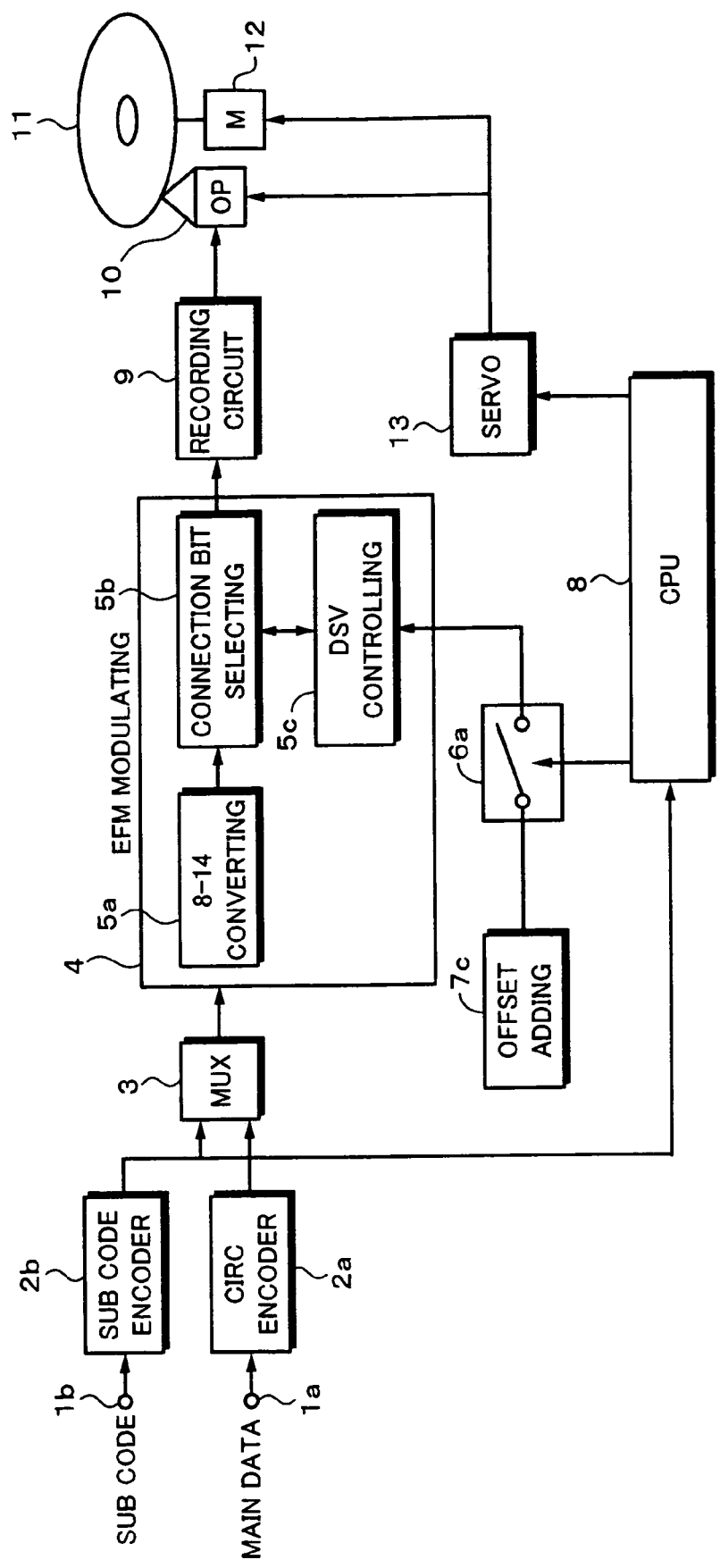
FIG. 7 is a block diagram showing an example of a more practical structure according to the embodiment of the present invention.

FIG. 7 shows a practical example of the structure of the EFM modulating system according to the embodiment of the present invention. In FIG. 7, similar structural portions to those shown in FIG. 1 will be denoted by similar reference numerals and their description will be omitted. A DSV controlling portion 5c that controls a connection bit selecting operation is connected to the connection bit selecting portion 5b of the EFM modulating portion 4. An offset is supplied from an offset adding portion denoted by reference numeral 7c to a controlling register of the DSV controlling portion 5c through a switch 6a. The switch 6a is controlled by the system controller 8.

In the normal control of the EFM modulation, the DSV is controlled so that it converges at 0. However, in the structure shown in FIG. 7, the switch 6a is turned on in each predetermined unit, for example each frame. An offset value m (±40, ±70, or the like) is supplied to the controlling register of the DSV controlling portion 5c. The switch 6a is controlled so that the DSV approaches −m. Thus, the DSV is controlled so that the absolute value thereof increases. The period for which the offset is supplied is not limited to one frame. In other words, the offset can be supplied in the unit of n frames (where n is any natural number).

Figure 8:
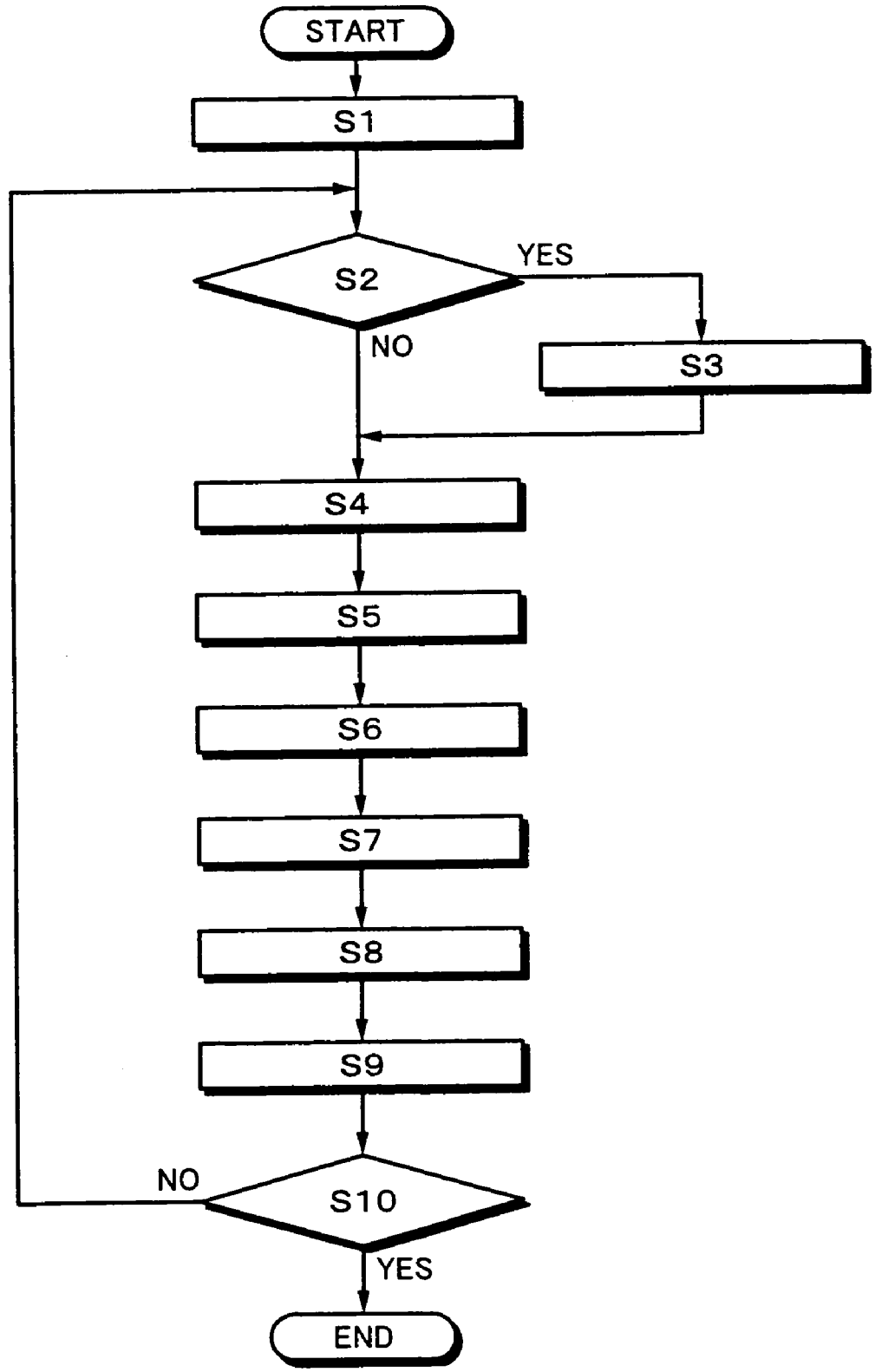
FIG. 8 is a flow chart showing an example of a more practical control according to the embodiment of the present invention.

FIG. 8 shows a flow of a controlling operation of the DSV controlling portion 5c. At step S1, 0 is designated as the value of the controlling register. At step S2, it is determined whether or not a second symbol preceded by a synchronous signal (referred to as sync) of an EFM frame has been detected. At the determining step, S2, a process for subtracting a target value for a frame sync and a sub code immediately preceded thereby from the controlling register (at step S3) is not performed. Instead, a process for decreasing a possibility of which an error takes place in the sync and the sub code is performed.

When the second symbol has been detected, at step S3, the target value is subtracted from the controlling register. When the second symbol has not been detected, at step S4, the symbol is EFM-modulated. In other words, a data symbol of eight bits is converted into a symbol of 14 bits in accordance with the conversion table.

At step S5, all patterns of "3 connection bits+EFM symbol" that satisfy the EFM run length conditions are listed up. At step S6, the DSV value of which the DSV value of the connection bits and the DSV value of the EFM symbol are added to the value of the controlling register for each of the listed patterns. At step S7, from the listed patterns, a pattern whose calculated result is closest to 0 is selected. At step S8, the selected "connection bits+EFM symbol" are output.

At step S9, the DSV values of the "connection bits+EFM symbol" that are output to the controlling register are added. At step S10, it is determined whether or not there is a symbol to be encoded. When there is no symbol to be encoded, the process is completed. When there is a symbol to be encoded, the flow returns to step S2. In other words, after there is no symbol to be encoded in one frame, the process is completed.

FIG. 9 and FIG. 10 show an example of the relation among sync/data symbols, EFM symbols (EFM signals), and DSV values in the case that EFM control is performed in the conventional EFM modulation. In FIG. 9 and FIG. 10, since the space of the drawings is limited, successive data that chronologically varies is separately shown in two drawings.

One frame starts with a frame sync (SYNC) having a predetermined bit pattern. The frame sync is followed by a symbol of a sub code. The sync/data symbols are denoted in hexadecimal notation. The EFM signals are represented in NRZ where "0" and "1" correspond to a low level and a high level of a waveform, respectively. In addition, connection bits (three channel bits) are added at the beginning of each EFM signal.

d-DSV represents a single DSV value of sync/data to which connection bits are added. d-DSV is obtained in the relation of which "0" and "1" of bits of an EFM signal are −1 and +1, respectively. The DSV is a value of which d-DSV values are cumulated. In FIG. 9 and FIG. 10, one EFM frame and a part of the next frame are shown. As is clear from FIG. 9 and FIG. 10, the DSV is controlled so that it converges at nearly 0.

FIG. 11 and FIG. 12 show an example of the DSV control shown in FIG. 8 according to the present invention. In this example, the DSV is controlled so that it converges to +60 in each EFM frame. Like the DSV control shown in FIG. 9 and FIG. 10, FIG. 11 and FIG. 12 show an EFM frame that chronologically varies using two separated drawings. In FIG. 11 and FIG. 12, R represents the value of the content of the controlling register of the DSV controlling portion 5*c*.

An EFM frame starts with a sync. The sync is followed by a sub code symbol S0. The sub code symbol S0 is a symbol at the beginning of a sub code frame of 98 frames. The sub code symbol S0 is followed by a symbol S1. The symbols S0 and S1 are synchronous signals of the sub code frame. At timing of the second symbol after the EFM frame sync (a data symbol [24] in FIG. 11), an offset value of −60 is supplied to the controlling register. In this case, the DSV at the timing (for example, −2) is added to the offset value. An added result of −62 is set to the controlling register. The value −60 is an example. As long as the absolute value of the offset value is m (where m 15: positive integer), any value can be set. 15 is a value with which the DSV increases and there is a possibility of which an error takes place in data that is reproduced.

When the offset value −60 is added to the content of the controlling register, +60 is designated as a target value. As a result, the DSV is controlled so that the value R of the controlling register converse at 0 and the DSV increases to +60. In other words, when a predetermined value is designated for the controlling register, the absolute value of the predetermined value is decreased. As a result, the DSV is controlled so that the absolute value thereof consequently increases. The offset value may be added at timing of a sub code.

The present invention can be applied to another digital modulating system instead of the EFM. For example, the present invention can be applied to 8-16 modulation (referred to as EFM Plus) used in a DVD (Digital Versatile Disc). In the 8-16 modulation, a data symbol of eight bits is converted into a code word of 16 channel bits. To do that, four types of code tables as shown in FIG. 13 are provided. The code tables are selected in accordance with state 1 to state 4. Each table defines a state that takes place after a code word has been selected (next state).

FIG. 13 shows a main conversion table. Besides the main conversion table, an auxiliary table as shown in FIG. 14 is provided. Likewise, the auxiliary table is composed of four code conversion tables. When the 8-16 conversion is performed using the main table shown in FIG. 13, if the absolute value of the DSV exceeds a predetermined value, the auxiliary table is used to cause the DSV not to exceed the predetermined value. The main conversion table is applied for all data symbols in the range from 0 to 255. In contrast, the auxiliary table is applied for only parts of data symbols in the range from for example 0 to 127.

Figure 15:
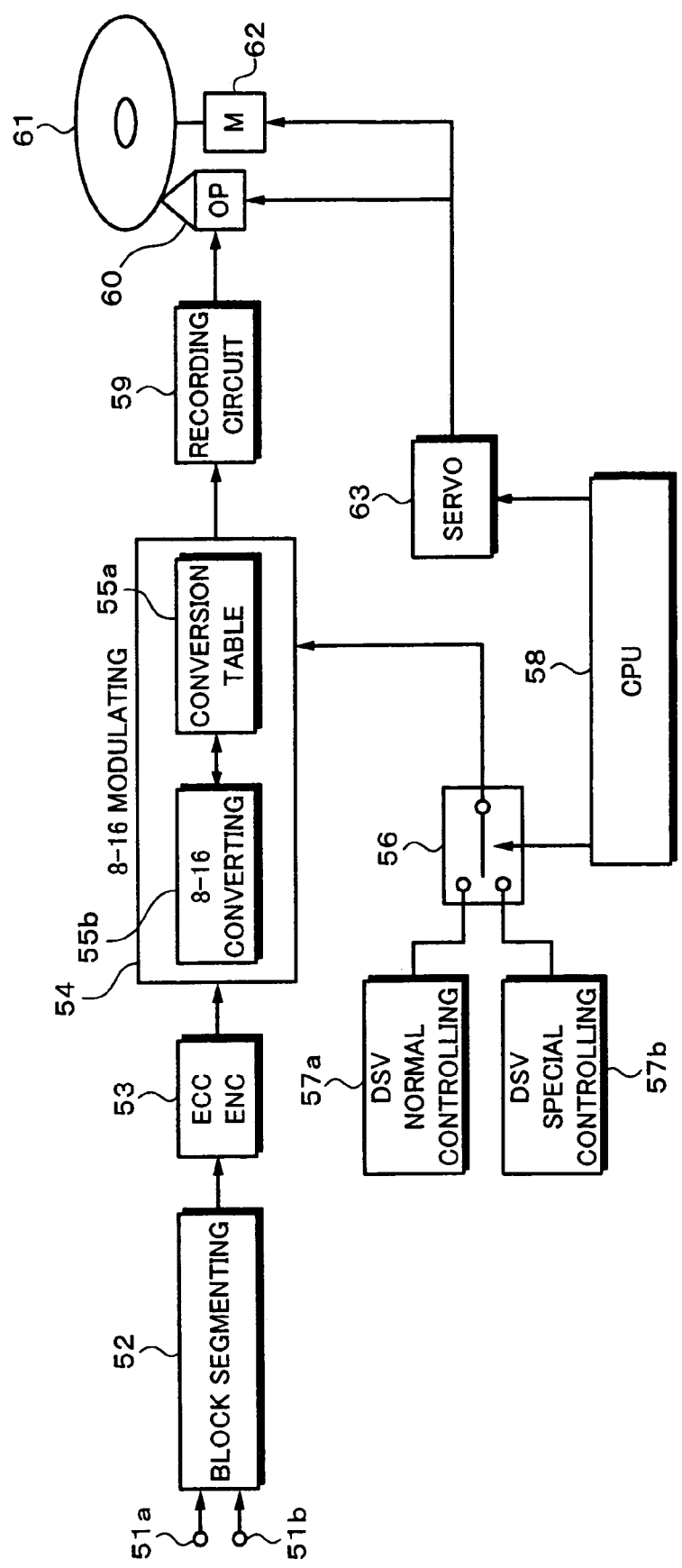
FIG. 15 is a block diagram showing the structure of a recording apparatus that performs the 8-16 modulation according to another embodiment of the present invention.

FIG. 15 shows an example of the structure of a recording apparatus that performs the 8-16 modulation according to the present invention. Main data such as compressed video data that is recorded is supplied from an input terminal 51*a* to a block segmenting circuit 52. ID information is supplied from an input terminal 51*b* to the block segmenting circuit 52. The block segmenting circuit 52 segments main data and ID information as a block. Output data of the block segmenting circuit 52 is supplied to an error correction code encoder 53. The error correction code encoder 53 performs an error correction code encoding process for adding error correction parity data or the like to the data that is output from the block segmenting circuit 52.

Output data of the error correction code encoder 53 is supplied to an 8-16 modulating portion 54. The 8-16 modulating portion 54 is composed of a conversion table 55*a* and an 8-16 converting portion 55*b*. The conversion table 55*a* is used to convert a data symbol of eight bits into a code word of 16 bits using the foregoing main conversion table and auxiliary conversion table. The 8-16 converting portion 55*b* converts a data symbol of eight bits into a code word of 16 channel bits in accordance with the conversion table 55*a*.

The 8-16 modulating portion 54 has DSV controlling portions that are a DSV normal controlling portion 57*a* and a DSV special controlling portion 57*b*. The DSV normal controlling portion 57*a* or the DSV special controlling portion 57*b* is selected by a switch 56. The switch 56 is controlled by a system controller 58 composed of a CPU. In a predetermined region that is pre-designated on an optical disc, the DSV special control is performed. The DSV special control causes the absolute value of the DSV to increase in a direction of which data is prevented from being normally reproduced. In contrast, the DSV normal control causes the absolute value of the DSV to converge at 0. In this case, the DSV represents a cumulated DSV.

The predetermined region is defined with address information. Like the foregoing embodiment, the predetermined region is an area for copy protection or security. Information necessary for encrypting a content recorded on a disc and generating encryption key information is recorded in the predetermined region. In addition, identification information unique to a disc may be recorded in the predetermined region. When the DSV special control is performed in the predetermined region, this state may represent that the disc is an original disc.

The 8-16 modulating portion 54 generates a record signal in the EFM Plus frame format. The record signal is supplied from the EFM modulating portion 54 to an optical pickup 60 through a recording circuit 59. Data is recorded on a recordable optical disc 61 such as a DVD-R (Recordable) disc by the optical pickup 60. The optical disc 61 is placed on a turn table and rotated at CLV by a spindle motor 62.

A servo portion 63 generates various types of servo drive signals that are a focus servo drive signal, a tracking servo drive signal, a thread servo drive signal, and a spindle servo drive signal in accordance with an operation command received from a system controller 58 composed of a CPU. These signals are output to the spindle motor 62 and the optical pickup 60. The system controller 58 controls the entire recording apparatus. The system controller 58 is connected to a display portion, operation switches, and so forth (not shown). The optical pickup 60 focuses a light beam of a semiconductor laser on a signal side of the optical disc 61 and records data on concentrically circular shaped tracks or spirally shaped tracks formed on the optical disc 61. The entire optical pickup 60 is moved by a thread mechanism.

Like the foregoing embodiment, the optical disc 61 is used as a master disc. By a mastering process, a disc master is produced. With the disc mater, a stamper is produced. By a replicating process, many DVD-Video discs are produced.

The structure of the apparatus that reproduces data from an optical disc whose DSV is controlled is the same as the structure of the reproducing apparatus shown in FIG. 3. In other words, in the predetermined region, it is determined whether or not the DSV is specially controlled. In the predetermined region of the original disc, the absolute value of the DSV is increased so that data is prevented from being normally reproduced. In reality, the increased absolute value of the DSV adversely affects an asymmetry compensation or the like of the reproducing circuit. As a result, a read error takes place. Alternatively, many errors take place. As a result, the errors will not be corrected or will be incorrectly corrected or detected. As a result, a situation of which whenever the value of data is read from the predetermined region, the value varies. The reproduction state or monitor information of the error state is detected. Monitor information of the reproduction state or error state is detected and supplied to the system controller of the reproducing apparatus.

When the DSV is not specially controlled in the predetermined region, the absolute value of the DSV does not increase. Depending on whether or not data can be normally reproduced from the predetermined region, it can be determined whether the disc is an original disc or a copied disc. When the disc is a copied disc, an alarm is output and data is prohibited from being reproduced therefrom. In addition, data for copy protection such as key information or security can be recorded in the predetermined region in which the DSV is specially controlled.

Figure 16:
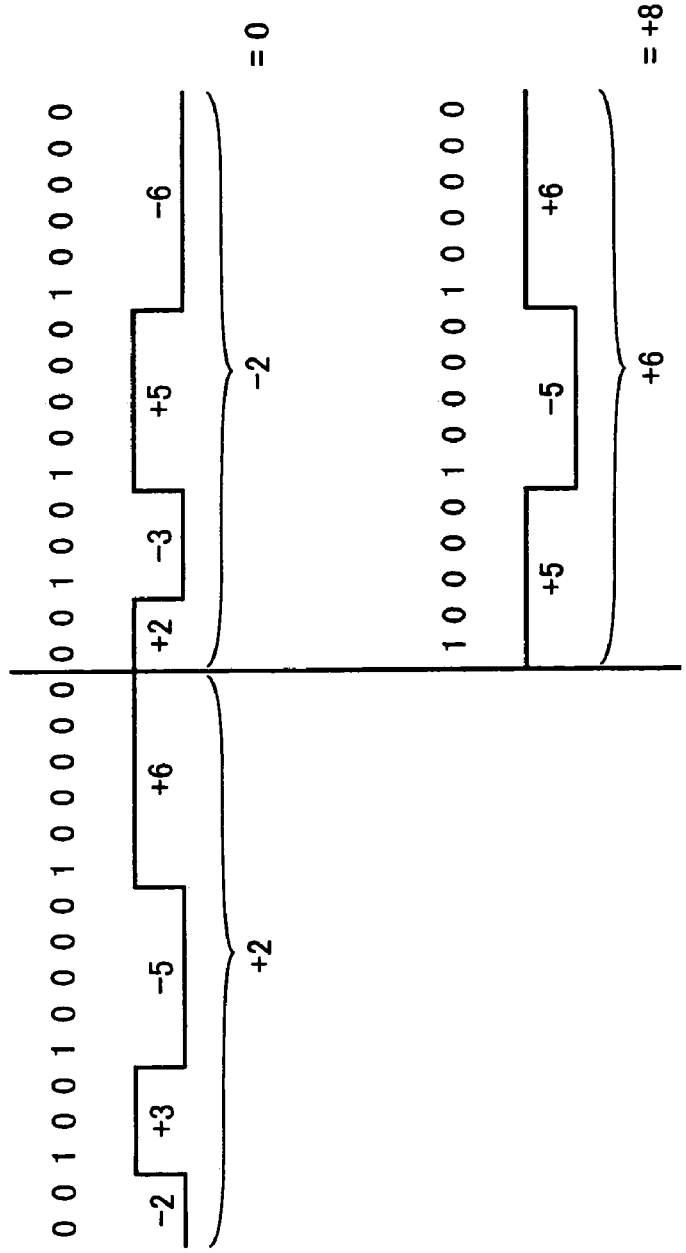
FIG. 16 is a schematic diagram describing the DSV control according to the other embodiment.
Figure 17:
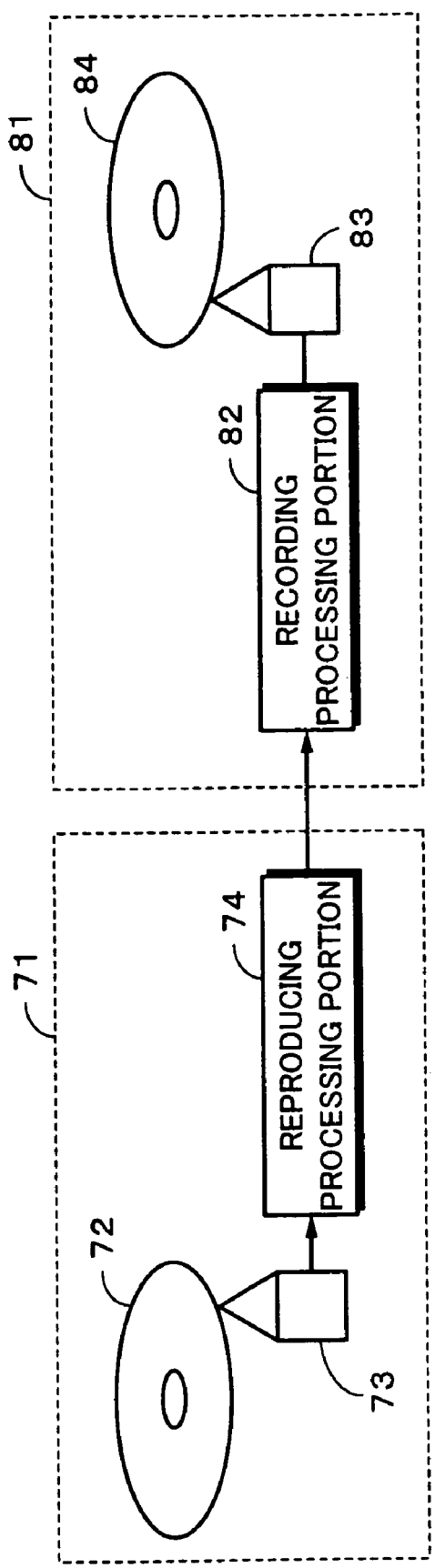
FIG. 17 is a block diagram describing a flow of a copy operation for a disc.

FIG. 16 shows an example of the DSV control in the 8-16 modulation. As shown in FIG. 16A, assuming that the current state of a data symbol "65" in decimal notation is state 1, the data symbol is converted into a code word of 16 channel bits (0010010000100000) in accordance with the conversion table for the state 1. The DSV of the code word of 16 bits is +2. The next state is defined as state 2. Thus, the data symbol "65" in decimal notation is converted into a code word of 16 channel bits (0010010000100000). The DSV of the code word of 16 channel bits is −2. Thus, the cumulated DSV is 0. The DSV normal control causes the absolute value of the DSV not to increase.

As shown in FIG. 16B, a second code word is selected in accordance with a conversion table for state 3 or state 4 rather than state 1. The data symbol "65" is converted into a code word of 16 channel bits (1000010000100000) in accordance with the conversion table for state 3 or state 4. The data of the code word is +6. Thus, the cumulated DSV of the first code word and the second code word is +8. As a result, the absolute value of the DSV increases. In other words, when a code conversion table is selected in accordance with other than the normal rule, the absolute value of the DSV can be increased so that data is prevented from being normally reproduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, the present invention can be applied to other modulating method such as 8-10 modulation, 1-7 modulation, and 2-3 modulation other than for example EFM and EFM Plus.

The present invention can be applied to a multiple-session optical disc on which for example data in the CD-DA format and data in the CD-ROM format are recorded. In addition, various types of data such as audio data, video data, still picture data, character data, computer graphic data, game software, and computer programs can be recorded on an optical disc. Thus, the present invention can be also applied to for example a DVD-ROM disc. In addition, the present invention can be applied to a card-shaped data recording medium as well as a disc-shaped recording medium. Moreover, the present invention can be applied to a magnetic recording medium.

The invention claimed is:

1. A data recording method, comprising:
modulating input data for each of a predetermined unit;
selecting predetermined connection bits that are placed between two sequences of modulated data, each sequence corresponding to the predetermined unit, causing the absolute value of a DSV to increase in only a predetermined region of a disc;
recording the modulated data for each predetermined unit and the selected connection bits to the disc
the disc having a recording area including a synchronous signal area and a data area, and said predetermined region is the data area; and
determining if the disc is an original disc or a copied disc, the presence of the increased DSV in the region indicating that the disc is original, the absence of the increased DSV indicating that the disc is a copy of the original.

2. The data recording method as set forth in claim 1, wherein the selecting is performed by selecting connection bits from a plurality of patterns of connection bits so that the absolute value of the DSV increases.

3. The data recording method as set forth in claim 1, wherein the selecting is performed by selecting a predetermined code conversion table from a plurality of different code conversion tables so that the absolute value of the DSV increases and selecting connection bits in accordance with the selected code conversion table.

4. The data recording method as set forth in claim 1, wherein the predetermined region is an area for copy protection or security of a recording medium.

5. The data recording method as set forth in claim 1, wherein when the absolute value of the DSV increases, data that is reproduced is prevented from being normally read.

6. The data recording method as set forth in claim 1, wherein an error of the data causes the value of the data to vary whenever it is read.

7. The data recording method as set forth in claim 1, wherein the selecting is performed by designating an initial value for the DSV with an offset in only the predetermined region and selecting the connection bits so that the absolute value of the DSV increases.

8. The data recording method as set forth in claim 7, wherein the selecting is performed by designating an initial value for the DSV with an offset in only the predetermined region and selecting the connection bits so that the absolute value of the initial value decreases.

9. The data recording method as set forth in claim 8, wherein the offset is applied every n predetermined units, where n is any natural number.

10. The data recording method as set forth in claim 9, wherein the offset is applied for each frame composed of a plurality of predetermined units of modulated data.

11. The data recording method as set forth in claim 8, wherein when the data area includes a sub code recording area, the offset is applied for other than the sample code recording area.

12. A data recording apparatus, comprising:
modulating means for modulating input data for each predetermined unit and selecting predetermined connection bits placed between two sequences of modulated data, each sequence corresponding to the predetermined unit;

recording means for recording the modulated data for each predetermined unit and the predetermined connection bits; and controlling means for causing the modulating means to select connection bits so that the absolute value of the DSV increases in a predetermined region of a disc so that the region is not reproduceable, the disc having a recording area including a synchronous signal area and a data area, and said predetermined region is the data area determining if the disc is an original disc or a copied disc, the presence of the increased DSV in the region indicating that the disc is original, the absence of the increased DSV indicating that the disc is a copy of the original.

13. The data recording apparatus as set forth in claim 12, wherein the controlling means is configured to select connection bits from a plurality of patterns of connection bits so that the absolute value of the DSV increases.

14. The data recording apparatus as set forth in claim 12, wherein the modulating means has a plurality of different code conversion tables, and
wherein the controlling means is configured to select a code conversion table from the plurality of different code conversion tables so that the absolute value of the DSV increases and selecting connection bits in accordance with the selected code conversion table.

15. The data recording apparatus as set forth in claim 12, wherein the controlling means is configured to designate an initial value for the DSV with an offset in only the predetermined region and select connection bits so that the absolute value of the DSV increases.

16. The data recording apparatus as set forth in claim 15, wherein the controlling means is configured to designate an initial value for the DSV with an offset in only the predetermined region and select connection bits so that the absolute value of the DSV decreases.

17. A recording medium, comprising:
a plurality of predetermined units of modulated data and connection bits thereon recorded, the connection bits being placed between two sequences of modulated data, each sequence corresponding to the predetermined unit, the connection bits being recorded in a predetermined region of a disc, so that the absolute value of a DSV increases so that the region is not reproduceable, the disc having a recording area including a synchronous signal area and a data area, and said predetermined region is the data area, the presence of the increased DSV in the region indicating that the disc is original, the absence of the increased DSV indicating that the disc is a copy of the original.

18. The recording medium as set forth in claim 17, wherein the predetermined region is an area for copy protection or security.

19. The recording medium as set forth in claim 17, wherein the data area has a sub code recording area, and wherein the connection bits are recorded in other than the sub code recording area of the data area so that the absolute value of the DSV increases.

20. A data reproducing method, comprising:
reproducing data from a recording medium on which a plurality of predetermined units of modulated data and connection bits are recorded, the connection bits being placed between two sequences of modulated data, each sequences corresponding to the predetermined unit, the connection bits being recorded in a predetermined region of a disc, so that the absolute value of a DSV increases so that the region is not reproduceable the disc having a recording area including a synchronous signal area and a data area, and said predetermined region is the data area;

detecting a reproduction state from the reproduced data; and determining if the disc is an original disc or a copied disc, the presence of the increased DSV in the region indicating that the disc is original, the absence of the increased DSV indicating that the disc is a copy of the original.

21. The data reproducing method as set forth in claim 20, further comprising:
determining whether or not the recording medium is an original recording medium in accordance with the reproduction state.

22. The data reproducing method as set forth in claim 20, further comprising:
determining whether or not data can be reproduced in accordance with the reproduction state.

23. The data reproducing method as set forth in claim 19, further comprising:
detecting an error state of data in accordance with the reproduction state.

24. The data reproducing method as set forth in claim 19, further comprising:
determining whether or not data accessed a plurality of times and obtained is the same in accordance with the reproduction state.

25. The data reproducing method as set forth in claim 19, wherein the predetermined region is an area for copy protection or security, and
wherein the data reproducing method further comprises:
causing reproducing means to access the predetermined region.

26. The data reproducing method as set forth in claim 20, further comprising:
prohibiting data from being reproduced when the detected result at the detecting step represents that the recording medium is a copied recording medium.

27. The data reproducing method as set forth in claim 20, further comprising:
generating an alarm that represents that data is reproduced from a copied recording medium when the detected result at the detecting step represents that the recording medium is a copied recording medium.

28. A data reproducing apparatus, comprising:
reproducing means for reproducing data from a recording medium on which a plurality of predetermined units of modulated data and connection bits are recorded, the connection bits being placed between two sequences of modulated data, each sequences corresponding to the predetermined unit, the connection bits being recorded in a predetermined region of a disc, so that the absolute value of a DSV increases so that the region is not reproduceable the disc having a recording area including a synchronous signal area and a data area, and said predetermined region is the data area;

controlling means for causing the reproducing means to reproduce the predetermined region and detect a reproduction state of the reproduced data; and determining if the disc is an original disc or a copied disc, the presence of the increased DSV in the region indicating that the disc is original, the absence of the increased DSV indicating that the disc is a copy of the original.

29. The data reproducing apparatus as set forth in claim 28,
wherein the controlling means determines whether or not the recording medium is an original recording medium in accordance with the reproduction state.

30. The data reproducing apparatus as set forth in claim 28,
wherein the controlling means determines whether or not data can be reproduced in accordance with the reproduction state.

31. The data reproducing apparatus as set forth in claim 28,
wherein the controlling means detects an error state of data in accordance with the reproduction state.

32. The data reproducing apparatus as set forth in claim 28,
wherein the controlling means determines whether or not data accessed a plurality of times and obtained is the same in accordance with the reproduction state.

33. The data reproducing apparatus as set forth in claim 28,
wherein the predetermined region is an area for copy protection or security, and
wherein the controlling means causes the reproducing means to access the predetermined region.

34. The data reproducing apparatus as set forth in claim 33,
wherein the controlling means prohibits data from being reproduced when the controlling means has determined that the recording medium is a copied recording medium.

35. The data reproducing apparatus as set forth in claim 34, further comprising:
alarm generating means for generating an alarm,
wherein the controlling means controls the alarm generating means to generate an alarm that represents that data is reproduced from a copied recording medium when the controlling means has determined that the recording medium is a copied recording medium.

36. The data reproducing apparatus of claim 33, wherein the predetermined region includes an encryption key.

37. The data reproducing apparatus of claim 25, wherein the predetermined region includes an encryption key.

38. The data reproducing apparatus of claim 18, wherein the predetermined region includes an encryption key.

39. The data reproducing apparatus of claim 4, wherein the predetermined region includes an encryption key.

* * * * *